| (12) | United States Patent | (10) Patent No.: | US 9,835,237 B2 |
|---|---|---|---|
| | Hwang et al. | (45) Date of Patent: | Dec. 5, 2017 |

(54) POWER TRANSMISSION APPARATUS FOR VEHICLE

(71) Applicant: HYUNDAI MOTOR COMPANY, Seoul (KR)

(72) Inventors: Seong Wook Hwang, Gunpo-si (KR); Yong Uk Shin, Suwon-si (KR); Seongwook Ji, Ansan-si (KR); Woochurl Son, Seongnam-si (KR); Wonmin Cho, Hwaseong-si (KR); Hyun Sik Kwon, Seoul (KR); Ki Been Lim, Yongin-si (KR); Woo Jin Chang, Suwon-si (KR); Jae Chang Kook, Hwaseong-si (KR); Ki Tae Kim, Incheon (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/226,247

(22) Filed: Aug. 2, 2016

(65) Prior Publication Data

US 2017/0159779 A1 Jun. 8, 2017

(30) Foreign Application Priority Data

Dec. 2, 2015 (KR) .......................... 10-2015-0170976

(51) Int. Cl.
*F16H 37/06* (2006.01)
*F16H 37/04* (2006.01)
(Continued)

(52) U.S. Cl.
CPC ........... *F16H 37/042* (2013.01); *F16H 3/006* (2013.01); *F16H 3/091* (2013.01); *F16H 3/66* (2013.01);
(Continued)

(58) Field of Classification Search
CPC ...... F16H 3/006; F16H 37/042; F16H 37/065; F16H 37/08; F16H 2037/047;
(Continued)

(56) References Cited

U.S. PATENT DOCUMENTS

| 5,823,051 A | * | 10/1998 | Hall, III | .................. F16H 3/006 |
|---|---|---|---|---|
| | | | | 475/207 |
| 6,273,838 B1 | * | 8/2001 | Park | ........................ F16H 3/666 |
| | | | | 475/280 |

(Continued)

FOREIGN PATENT DOCUMENTS

| JP | 4361794 B2 | 11/2009 |
|---|---|---|
| KR | 10-1181746 B1 | 9/2012 |

(Continued)

*Primary Examiner* — Huan Le
(74) *Attorney, Agent, or Firm* — McDermott Will & Emery LLP

(57) ABSTRACT

A power transmission apparatus for a vehicle includes a first input shaft directly connected to an engine, a second input shaft enclosing the first input shaft and rotating independently from the first input shaft and selectively receiving torque of the engine through a first clutch, a third input shaft enclosing the second input shaft and rotating independently from with the second input shaft and selectively receiving the torque of the engine through a second clutch, an intermediate shaft disposed in parallel with the first, second and third input shafts, a transfer gear fixedly disposed on the intermediate shaft and outputting torque of the intermediate shaft, a first shifting member, a second shifting member, and a third shifting member for changing the torque of the engine.

10 Claims, 4 Drawing Sheets

(51) Int. Cl.
    *F16H 3/00*         (2006.01)
    *F16H 3/091*      (2006.01)
    *F16H 3/66*        (2006.01)

(52) U.S. Cl.
    CPC ... *F16H 37/065* (2013.01); *F16H 2200/0069* (2013.01); *F16H 2200/2007* (2013.01); *F16H 2200/2035* (2013.01)

(58) Field of Classification Search
    CPC ....... F16H 2037/048; F16H 2200/0069; F16H 2200/2007; F16H 2200/2035; F16H 37/06
    See application file for complete search history.

(56) References Cited

U.S. PATENT DOCUMENTS

| | | |
|---|---|---|
| 2004/0200300 A1 | 10/2004 | Ahrens |
| 2010/0125020 A1 | 5/2010 | Ikegami et al. |
| 2012/0065015 A1* | 3/2012 | Tamai et al. ........... B60K 6/445 |
| | | 475/5 |
| 2012/0065016 A1 | 3/2012 | Tamai et al. |
| 2016/0146320 A1* | 5/2016 | Mordukhovich ....... F16H 3/097 |
| | | 475/207 |

FOREIGN PATENT DOCUMENTS

| | | |
|---|---|---|
| KR | 10-2014-0133112 A | 11/2014 |
| KR | 10-2015-0071605 A | 6/2015 |

\* cited by examiner

FIG. 2

| Speed stages | CL1 | CL2 | CL3 | BK | SL1 | | | SL2 | | | SL3 | |
|---|---|---|---|---|---|---|---|---|---|---|---|---|
| | | | | | D1/9 | N | D3/7 | D2/8 | N | D4/6 | D10/R | N |
| REV | − | △ | | ● | | ● | | | ● | | ● | |
| N | − | − | | ● | | ● | | | ● | | | ● |
| D1 | △ | − | | ● | ● | | | | ● | | | ● |
| D2 | − | △ | | ● | | ● | | ● | | | | ● |
| D3 | △ | − | | ● | | | ● | | ● | | | ● |
| D4 | − | △ | | ● | | ● | | | | ● | | ● |
| D5 | − | − | ● | ● | | ● | | | ● | | | ● |
| D6 | − | △ | ● | | | ● | | | | ● | | ● |
| D7 | △ | − | ● | | | | ● | | ● | | | ● |
| D8 | − | △ | ● | | | ● | | ● | | | | ● |
| D9 | △ | − | ● | | ● | | | | ● | | | ● |
| D10 | − | △ | ● | | | ● | | | ● | | ● | |

POWER TRANSMISSION APPARATUS FOR VEHICLE

CROSS-REFERENCE TO RELATED APPLICATION

This application claims the benefit of priority to Korean Patent Application No. 10-2015-0170976, filed with the Korean Intellectual Property Office on Dec. 2, 2015, the entire contents of which are incorporated herein by reference.

TECHNICAL FIELD

The present disclosure relates to a power transmission apparatus for a vehicle. More particularly, the present disclosure relates to a power transmission apparatus for a vehicle that realizes ten forward speed stages and one reverse speed stage using three synchronizers and two planetary gear sets.

BACKGROUND

Environmentally-friendly traits of vehicles are very important technologies on which the motor industry is dependent. Vehicle makers are focusing on development of environmentally-friendly vehicles to meet environment and fuel consumption regulations.

Some examples of future vehicle technologies include electric vehicles (EV) and hybrid electric vehicles (HEV) that use electrical energy, and double clutch transmissions (DCT) that improve efficiency and convenience.

The DCT may include two clutch devices and a gear train of a manual transmission. The DCT may selectively transmit torque input from an engine to two input shafts through two clutches, change the torque selectively transmitted to the two input shafts through the gear train, and output the changed torque.

The DCT may be used to realize a compact transmission achieving a forward speed stage higher than a fifth forward speed stage. The DCT may be used as an automated manual transmission that does not require a driver's manual manipulation by controlling two clutches and synchronizing devices by a controller.

Compared with an automatic transmission with planetary gear sets, the DCT has excellent power delivery efficiency, simplifies changing and adding components for achieving multiple gear stages, and improves fuel economy.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a power transmission apparatus for a vehicle having advantages of achieving ten forward speed stages and a reverse speed stage, realizing multiple speed stages, and improving fuel economy by adding two planetary gear sets to a DCT including three synchronizers.

Another embodiment of the present disclosure provides a power transmission apparatus for a vehicle having further advantages of simplifying an interior layout and minimizing weight of the power transmission apparatus by reducing the number of components, and of improving fuel economy by achieving ten forward speed stages and one reverse speed stage with three synchronizers and two planetary gear sets.

A power transmission apparatus for a vehicle according to an exemplary embodiment of the present disclosure may include: a first input shaft directly connected to an engine; a second input shaft enclosing the first input shaft rotating independently from the first input shaft and selectively receiving torque of the engine through a first clutch; a third input shaft enclosing the second input shaft rotating independently from the second input shaft and selectively receiving the torque of the engine through a second clutch; an intermediate shaft disposed in parallel with the first, second, and third input shafts; a transfer gear fixedly disposed on the intermediate shaft and outputting torque of the intermediate shaft; a first shifting member receiving the torque of the engine from the second input shaft, changing the torque of the engine into first and second preliminarily shifted torques, and outputting the first and second preliminarily shifted torques; a second shifting member receiving the torque of the engine from the third input shaft, changing the torque of the engine into third, fourth, and fifth preliminarily shifted torques, and outputting the third, fourth, and fifth preliminarily shifted torques; and a third shifting member changing the torque of the engine selectively transmitted from the first input shaft and the first preliminarily shifted torque to the fifth preliminarily shifted torque selectively transmitted from the first shifting member or the second shifting member into ten forward speed stages and one reverse speed stage, and outputting the ten forward speed stages and the one reverse speed stage.

The first shifting member may include: a 1/9 drive gear rotatably disposed on the second input shaft; a 3/7 drive gear rotatably disposed on the second input shaft and engaged with the transfer gear on the intermediate shaft; a first synchronizer operably connecting the 1/9 drive gear or the 3/7 drive gear to the second input shaft selectively; and a 1/9 driven gear fixedly disposed on the intermediate shaft and engaged with the 1/9 drive gear.

In one aspect, the second shifting member may include: a 2/8 drive gear, a 4/6 drive gear and a 10/R drive gear fixedly disposed on the third input shaft; a 2/8 driven gear rotatably disposed on the intermediate shaft and engaged with the 2/8 drive gear; a 4/6 driven gear rotatably disposed on the intermediate shaft and engaged with the 4/6 drive gear; a second synchronizer operably connecting the 2/8 driven gear or the 4/6 driven gear to the intermediate shaft selectively; a 10/R driven gear rotatably disposed on the intermediate shaft and operably connected to the 10/R drive gear through an idle gear on an idle shaft; and a third synchronizer operably connecting the 10/R driven gear to the intermediate shaft selectively.

In another aspect, the second shifting member may include: a 2/8 drive gear, a 4/6 drive gear and a 10/R drive gear rotatably disposed on the third input shaft; a second synchronizer operably connecting the 2/8 drive gear or the 4/6 drive gear to the third input shaft selectively; a third synchronizer operably connecting the 10/R drive gear to the third input shaft selectively; a 2/8 driven gear fixedly disposed on the intermediate shaft and engaged with the 2/8 drive gear; a 4/6 driven gear fixedly disposed on the intermediate shaft and engaged with the 4/6 drive gear; and a 10/R driven gear fixedly disposed on the intermediate shaft and operably connected to the 10/R drive gear through an idle gear on an idle shaft.

The third shifting member may include: a first planetary gear set including a first sun gear, a first planet carrier, and a first ring gear as rotation elements thereof; a second planetary gear set including a second sun gear, a second planet carrier, and a second ring gear as rotation elements thereof; four rotation shafts directly connected to at least one rotation element among the rotation elements of the first planetary gear set and the second planetary gear set; and frictional elements, any one of the frictional elements selectively connecting any one rotation shaft among the four rotation shafts to the first input shaft and the other of the frictional elements selectively connecting another rotation shaft among the four rotation shafts to a transmission housing.

Each of the first planetary gear set and the second planetary gear set may be a single pinion planetary gear set.

The four rotation shafts may include: a first rotation shaft directly connected to the first sun gear and selectively connected to the transmission housing; a second rotation shaft directly connecting the first planet carrier to the second ring gear and directly connected to an output shaft; a third rotation shaft directly connecting the first ring gear to the second planet carrier and selectively connected to the first input shaft; and a fourth rotation shaft directly connected to the second sun gear and receiving torque from the first shifting member and the second shifting member.

The frictional elements may include: a third clutch disposed between the first input shaft and the third rotation shaft; and a brake disposed between the first rotation shaft and the transmission housing.

A power transmission apparatus for a vehicle according to another exemplary embodiment of the present disclosure may include: a first input shaft directly connected to an engine; a second input shaft enclosing the first input shaft rotating independently from the first input shaft and selectively receiving torque of the engine through a first clutch; a third input shaft enclosing the second input shaft rotating independently from the second input shaft and selectively receiving the torque of the engine through a second clutch; an intermediate shaft disposed in parallel with the first, second, and third input shafts; a transfer gear fixedly disposed on the intermediate shaft and outputting torque of the intermediate shaft; a first shifting member including at least two drive gears rotatably disposed on the second input shaft, at least one driven gear fixedly disposed on the intermediate shaft, and at least one synchronizer selectively connecting any of the at least two drive gears to the second input shaft, wherein one of the at least two drive gears is engaged with the transfer gear and the other of the at least two drive gears is engaged with the at least one driven gear; a second shifting member including at least two drive gears fixedly disposed on the third input shaft, at least two driven gears rotatably disposed on the intermediate shaft, and at least one synchronizer selectively connecting any of the at least two driven gears to the intermediate shaft, wherein one of the at least two drive gears is operably connected to one of the at least two driven gears through an idle gear and another of the at least two drive gears is engaged with another of the at least two driven gears; and a third shifting member receiving torque of the first shifting member or the second shifting member from the drive gear engaged with the transfer gear, selectively receiving the torque of the engine from the first input shaft, and changing and outputting the torque received from the first shifting member or the second shifting member and the torque of the engine.

The at least two drive gears of the first shifting member may include a 1/9 drive gear and a 3/7 drive gear, the at least one driven gear of the first shifting member may include a 1/9 driven gear, and the at least one synchronizer of the first shifting member may include a first synchronizer.

The 1/9 drive gear may be engaged with the 1/9 driven gear, the 3/7 drive gear may be engaged with the transfer gear, and the first synchronizer may selectively connect the 1/9 drive gear or the 3/7 drive gear to the second input shaft.

The at least two drive gears of the second shifting member may include a 2/8 drive gear, a 4/6 drive gear, and a 10/R drive gear, the at least two driven gears of the second shifting member may include a 2/8 driven gear, a 4/6 driven gear, and a 10/R driven gear, and the at least one synchronizer of the second shifting member may include second and third synchronizers.

The 2/8 drive gear may be engaged with the 2/8 driven gear, the 4/6 drive gear may be engaged with the 4/6 driven gear, the 10/R drive gear may be operably connected to the 10/R driven gear through the idle gear, the second synchronizer may selectively connect the 2/8 driven gear or the 4/6 driven gear to the intermediate shaft, and the third synchronizer may selectively connect the 10/R driven gear to the intermediate shaft.

The third shifting member may include: a first planetary gear set including a first sun gear, a first planet carrier, and a first ring gear as rotation elements thereof; a second planetary gear set including a second sun gear, a second planet carrier, and a second ring gear as rotation elements thereof; four rotation shafts directly connected to at least one rotation element among the rotation elements of the first planetary gear set and the second planetary gear set; and frictional elements, any one of the frictional elements selectively connecting any one rotation shaft among the four rotation shafts to the first input shaft and the other of the frictional elements selectively connecting another rotation shaft among the four rotation shafts to a transmission housing.

Other rotation shaft among the four rotation shafts may be directly connected to the drive gear engaged with the transfer gear.

The four rotation shafts may include: a first rotation shaft directly connected to the first sun gear and selectively connected to the transmission housing through a brake; a second rotation shaft directly connecting the first planet carrier to the second ring gear and directly connected to an output shaft; a third rotation shaft directly connecting the first ring gear to the second planet carrier and selectively connected to the first input shaft through a third clutch; and a fourth rotation shaft directly connected to the second sun gear and receiving torque from the first shifting member and the second shifting member.

A power transmission apparatus for a vehicle according to another exemplary embodiment of the present disclosure may include: a first input shaft directly connected to an engine; a second input shaft enclosing the first input shaft rotating independently from the first input shaft and selectively receiving torque of the engine through a first clutch; a third input shaft enclosing the second input shaft rotating independently from the second input shaft and selectively receiving the torque of the engine through a second clutch; an intermediate shaft disposed in parallel with the first, second, and third input shafts; a transfer gear fixedly disposed on the intermediate shaft and outputting torque of the intermediate shaft; a first shifting member including at least two drive gears rotatably disposed on the second input shaft, at least one driven gear fixedly disposed on the intermediate shaft, and at least one synchronizer selectively connecting any of the at least two drive gears to the second input shaft, wherein one of the at least two drive gears is engaged with the transfer gear and the other of the at least two drive gears is engaged with the at least one driven gear; a second shifting member including at least two drive gears rotatably disposed on the third input shaft, at least two driven gears fixedly disposed on the intermediate shaft, and at least one synchronizer selectively connecting any of the at least two drive gears to the third input shaft, wherein one of the at least two drive gears is operably connected to one of the at least two driven gears through an idle gear and another of the at least two drive gears is engaged with another of the at least two driven gears; and a third shifting member receiving torque of the first shifting member or the second shifting member from the drive gear engaged with the transfer gear, selectively receiving the torque of the engine from the first input shaft, and changing and outputting the torque received from the first shifting member or the second shifting member and the torque of the engine.

The at least two drive gears of the first shifting member may include a 1/9 drive gear and a 3/7 drive gear, the at least one driven gear of the first shifting member may include a 1/9 driven gear, and the at least one synchronizer of the first shifting member may include a first synchronizer.

The 1/9 drive gear may be engaged with the 1/9 driven gear, the 3/7 drive gear may be engaged with the transfer gear, and the first synchronizer may selectively connect the 1/9 drive gear or the 3/7 drive gear to the second input shaft.

The at least two drive gears of the second shifting member may include a 2/8 drive gear, a 4/6 drive gear, and a 10/R drive gear, the at least two driven gears of the second shifting member may include a 2/8 driven gear, a 4/6 driven gear, and a 10/R driven gear, and the at least one synchronizer of the second shifting member may include second and third synchronizers.

The 2/8 drive gear may be engaged with the 2/8 driven gear, the 4/6 drive gear may be engaged with the 4/6 driven gear, the 10/R drive gear may be operably connected to the 10/R drive gear through the idle gear, the second synchronizer may selectively connect the 2/8 drive gear or the 4/6 drive gear to the third input shaft, and the third synchronizer may selectively connect the 10/R drive gear to the third input shaft.

The third shifting member may include: a first planetary gear set including a first sun gear, a first planet carrier, and a first ring gear as rotation elements thereof; a second planetary gear set including a second sun gear, a second planet carrier, and a second ring gear as rotation elements thereof; four rotation shafts directly connected to at least one rotation element among the rotation elements of the first planetary gear set and the second planetary gear set; and frictional elements, any one of the frictional elements selectively connecting any one rotation shaft among the four rotation shafts to the first input shaft and the other of the frictional elements selectively connecting another rotation shaft among the four rotation shafts to a transmission housing.

Other rotation shaft among the four rotation shafts may be directly connected to the drive gear engaged with the transfer gear.

The four rotation shafts may include: a first rotation shaft directly connected to the first sun gear and selectively connected to the transmission housing through a brake; a second rotation shaft directly connecting the first planet carrier to the second ring gear and directly connected to an output shaft; a third rotation shaft directly connecting the first ring gear to the second planet carrier and selectively connected to the first input shaft through a third clutch; and a fourth rotation shaft directly connected to the second sun gear and receiving torque from the first shifting member and the second shifting member.

The exemplary embodiment of the present disclosure may achieve one reverse speed stage and ten forward speed stages by adding two planetary gear sets to a DCT provided with three synchronizers. Therefore, multiple speed stages are achieved and fuel economy is improved.

In addition, an interior layout may be simplified, length and weight of the DCT may be minimized by reducing the number of components.

In addition, since even-numbered speed stages and odd-numbered speed stages are achieved by turns by alternately operating two clutches, smooth shift may be achieved.

Other effects obtainable or predictable from an exemplary embodiment of the present disclosure will be explicitly or implicitly described in a DETAILED DESCRIPTION section. That is, various effects predictable from an exemplary embodiment of the present disclosure will be described in the DETAILED DESCRIPTION section.

BRIEF DESCRIPTION OF THE DRAWINGS

FIG. 2 is an operational chart of a power transmission apparatus for a vehicle according to an exemplary embodiment of the present disclosure.

DETAILED DESCRIPTION

Figure 1:
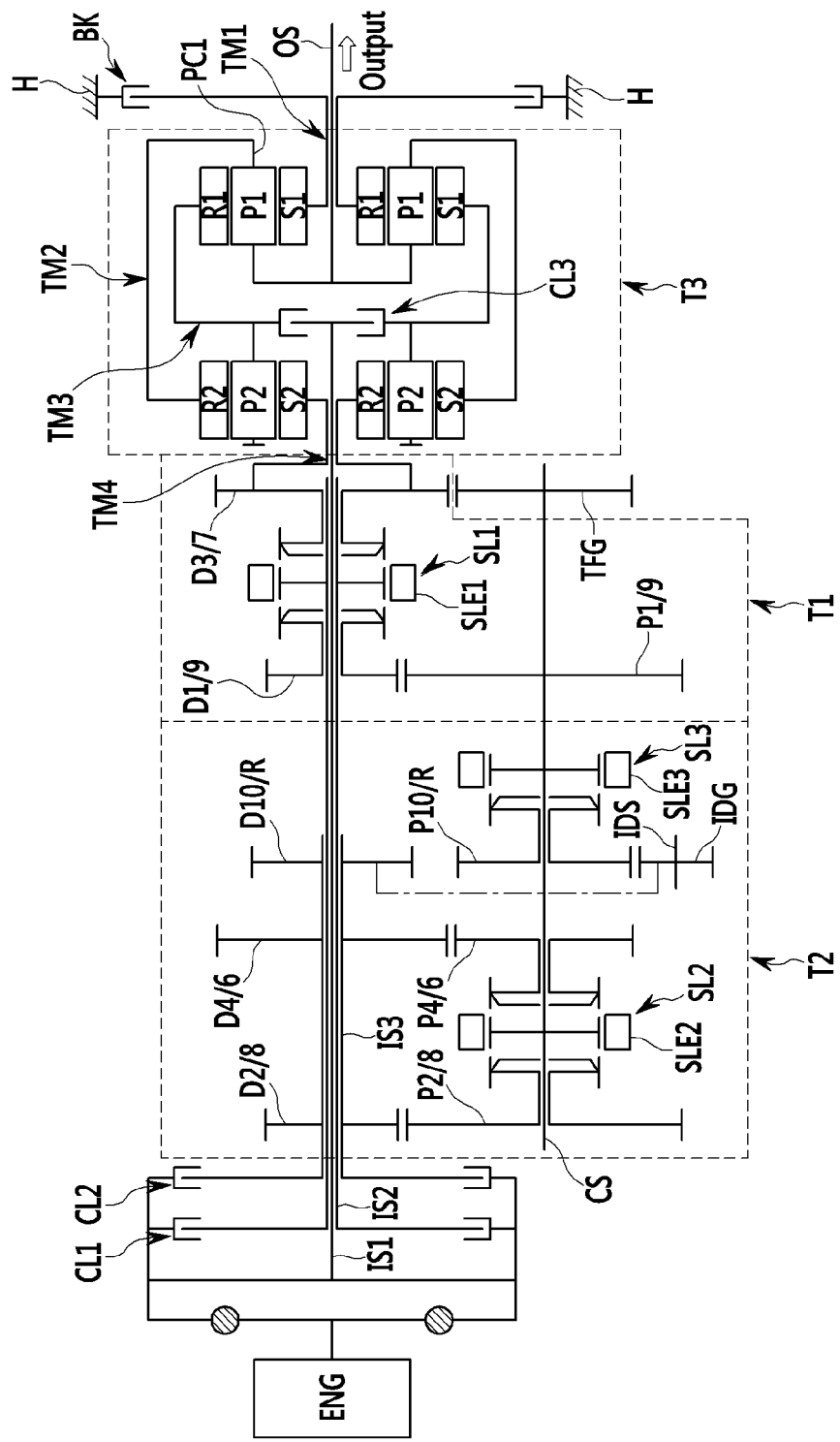
FIG. 1 is a schematic diagram of a power transmission apparatus for a vehicle according to an exemplary embodiment of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

Parts which are not related with the description may be omitted for clearly describing the exemplary embodiments of the present disclosure and like reference numerals may refer to like or similar elements throughout the specification.

In the following description, dividing names of components into first, second, and the like is to divide the names because the names of the components are the same as each other and an order thereof is not particularly limited.

FIG. 1 is a schematic diagram of a power transmission apparatus for a vehicle according to the first exemplary embodiment of the present disclosure.

Referring to FIG. 1, torque of an engine ENG that is a power source may be changed into five preliminarily shifted torques through a first shifting member T1 and a second shifting member T2 and the five preliminarily shifted torques may be transmitted to a third shifting member T3 in a power transmission apparatus according to a first exemplary embodiment of the present disclosure. The five preliminarily shifted torques transmitted to the third shifting member T3 may be changed into ten forward speed stages and one reverse speed stage, and the ten forward speed stages and the one reverse speed stage may be output.

The engine ENG that is the power source may be a gasoline engine or a diesel engine using a fossil fuel, or an electric motor.

The torque generated in the engine ENG may be transmitted to the first shifting member T1, the second shifting member T2 and the third shifting member T3 through first, second, and third input shafts IS1, IS2, and IS3.

The first input shaft IS1 may be directly connected to an output side of the engine ENG and directly transmit torque of the engine ENG to the third shifting member T3.

The second input shaft IS2 may be a hollow shaft, enclose the first input shaft IS1 without rotational interference therewith, may be selectively connected to the output side of the engine ENG through a first clutch CL1, and selectively transmit the torque of the engine ENG to the first shifting member T1.

The third input shaft IS3 may be a hollow shaft, enclose the second input shaft IS2 without rotational interference therewith, may be selectively connected to the output side of the engine ENG through a second clutch CL2, and selectively transmit the torque of the engine ENG to the second shifting member T2.

The first shifting member T1 may include a 1/9 drive gear D1/9, a 3/7 drive gear D3/7, a first synchronizer SL1 disposed on the second input shaft IS2, and a 1/9 driven gear P1/9 fixedly disposed on an intermediate shaft CS disposed in parallel with the second input shaft IS2 and engaged with the 1/9 drive gear D1/9.

The 1/9 drive gear D1/9 and the 3/7 drive gear D3/7 may be rotatably disposed on the second input shaft IS2, and the first synchronizer SL1 may operably connect the 1/9 drive gear D1/9 or the 3/7 drive gear D3/7 to the second input shaft IS2 selectively.

In addition, a transfer gear TFG engaged with the 3/7 drive gear D3/7 may be fixedly disposed on a rear portion of the intermediate shaft CS.

The first synchronizer SL1 may operably connect the 1/9 drive gear D1/9 or the 3/7 drive gear D3/7 to the second input shaft IS2 selectively. Therefore, the torque of the engine ENG may be transmitted to the third shifting member T3 through the 3/7 drive gear D3/7 without rotation speed change, or may be transmitted to the intermediate shaft CS through the first synchronizer SL1 and the 1/9 drive gear D1/9 and may then be transmitted to the third shifting member T3 through the 3/7 drive gear D3/7 engaged with the transfer gear TFG with the rotation speed being changed.

Therefore, a first preliminarily shifted torque for achieving a first forward speed stage and a ninth forward speed stage, and a second preliminarily shifted torque for achieving a third forward speed stage and a seventh forward speed stage may be generated in the first shifting member T1. Herein, the second preliminarily shifted torque may be the same as a rotation speed of the engine ENG.

The transfer gear TFG engaged with the 3/7 drive gear D3/7 fixedly disposed on the intermediate shaft CS may transmit torque transmitted from the first shifting member T1 and the second shifting member T2 to the third shifting member T3 through the 3/7 drive gear D3/7.

In addition, the 3/7 drive gear D3/7 may transmit torque of the intermediate shaft CS to the third shifting member T3 without rotation speed change, or may change rotation speed of the intermediate shaft CS according to gear ratios of the transfer gear TFG and the 3/7 drive gear D3/7 engaged with each other and transmit the changed rotation speed to the third shifting member T3.

The second shifting member T2 may include a 2/8 drive gear D2/8 fixedly disposed on the third input shaft IS3, a 4/6 drive gear D4/6 fixedly disposed on the third input shaft IS3, a 10/R drive gear D10/R fixedly disposed on the third input shaft IS3, a 2/8 driven gear P2/8 engaged with the 2/8 drive gear D2/8, a 4/6 driven gear P4/6 engaged with the 4/6 drive gear D4/6, a second synchronizer SL2 disposed on the intermediate shaft CS, a 10/R driven gear P10/R operably connected to the 10/R drive gear D10/R, a third synchronizer SL3 disposed on the intermediate shaft CS, an idle gear IDG engaged with the 10/R drive gear D10/R and the 10/R driven gear P10/R.

The 2/8 driven gear P2/8 and the 4/6 driven gear P4/6 may be rotatably disposed on the intermediate shaft CS, and the second synchronizer SL2 may operably connect the 2/8 driven gear P2/8 or the 4/6 driven gear P4/6 to the intermediate shaft CS selectively. In addition, the 10/R driven gear P10/R may be rotatably disposed on the intermediate shaft CS, and the third synchronizer SL3 may operably connect the 10/R driven gear P10/R to the intermediate shaft CS selectively.

The idle gear IDG may be disposed on an idle shaft IDS and cause the 10/R driven gear P10/R and the 10/R drive gear D10/R to rotate in the same direction.

Therefore, a third preliminarily shifted torque for achieving a second forward speed stage and an eighth forward speed stage, a fourth preliminarily shifted torque for achieving a fourth forward speed stage and a sixth forward speed stage, and a fifth preliminarily shifted torque for achieving a tenth forward speed stage and a reverse speed stage may be generated in the second shifting member T2. The fifth preliminarily shifted torque may be, or produce, an inverse rotation speed.

The third shifting member T3 may include first and second planetary gear sets PG1 and PG2, one clutch CL3 and one brake BK.

The first planetary gear set PG1 may be a single pinion planetary gear set and may include a first sun gear S1, a first planet carrier PC1 rotatably supporting a first pinion P1 that is externally meshed with the first sun gear S1, and a first ring gear R1 that is internally meshed with the first pinion P1 as rotation elements thereof.

The second planetary gear set PG2 may be a single pinion planetary gear set and may include a second sun gear S2, a second planet carrier PC2 rotatably supporting a second pinion P2 that is externally meshed with the second sun gear S2, and a second ring gear R2 that is internally meshed with the second pinion P2 as rotation elements thereof.

Since the first planet carrier PC1 may be directly connected to the second ring gear R2 and the first ring gear R1 may be directly connected to the second planet carrier PC2, the first and second planetary gear sets PG1 and PG2 may include four rotation shafts TM1 to TM4.

The four rotation shafts TM1 to TM4 will be described in detail below.

The first rotation shaft TM1 may be directly connected to the first sun gear S1 and may be selectively connected to a transmission housing H so as to be operated as a selective fixed element.

The second rotation shaft TM2 may directly connect the first planet carrier PC1 with the second ring gear R2 and may be directly connected to the output shaft OS so as to be operated as an output element continuously.

The third rotation shaft TM3 may directly connect the first ring gear R1 with the second planet carrier PC2 and may be selectively connected to the first input shaft IS1 so as to be operated as a selective input element.

The fourth rotation shaft TM4 may be directly connected to the second sun gear S2 and may be directly connected to the 3/7 drive gear D3/7 of the first shifting member T1.

The first ring gear R1 and the second planet carrier PC2 directly connected to the third rotation shaft TM3 may be selectively connected to the first input shaft IS1 through the third clutch CL3, and the first sun gear S1 directly connected to the first rotation shaft TM1 may be selectively connected to the transmission housing H through a brake BK.

The output shaft OS directly connected to the second rotation shaft TM2 may transmit torque output from the third shifting member T3 to a final speed reduction unit of a differential apparatus (not shown).

Since the first, second, and third synchronizers SL1, SL2, and SL3 may be well known to a person of an ordinary skill in the art, a detailed description thereof will be omitted. In addition, first, second, and third sleeves SLE1, SLE2, and SLE3 applied respectively to the first, second, and third synchronizers SL1, SL2, and SL3, as may be also well known to a person of an ordinary skill in the art, are operated by additional actuators (not shown) and the actuators may be controlled by a transmission control unit.

Figure 3:
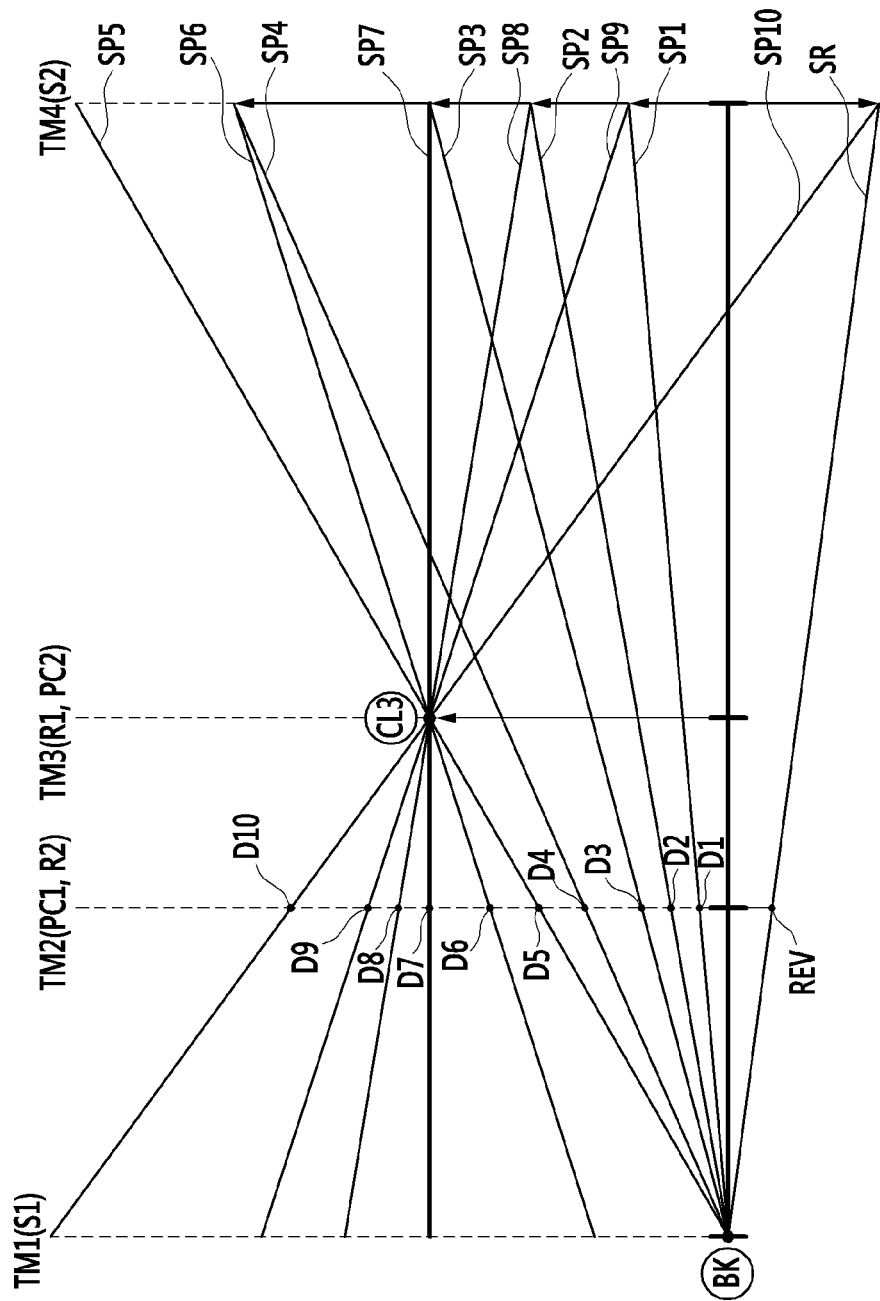
FIG. 3 is a lever diagram of a power transmission apparatus for a vehicle according an exemplary embodiment of the present disclosure.

FIG. 2 is an operational chart of a power transmission apparatus for a vehicle according to an exemplary embodiment of the present disclosure, and FIG. 3 is a lever diagram of a power transmission apparatus for a vehicle according to an exemplary embodiment of the present disclosure. Referring to FIG. 2 and FIG. 3, shifting processes of the power transmission apparatus will be described in detail below.

The third clutch CL3 may not be operated and torque input to the fourth rotation shaft TM4 may be operated as input torque at the first to the fourth forward speed stages and the reverse speed stage. On the contrary, the third clutch CL3 may be operated and torque input to the fourth rotation shaft TM4 and the third rotation shaft TM3 may be operated as input torque at the sixth to the tenth forward speed stages. In addition, since the third clutch CL3 may be operated but any synchronizer may not be operated at the fifth forward speed stage, torque input to the third rotation shaft TM3 may be operated as input torque.

[Reverse Speed Stage]

As shown in FIG. 2, the 10/R driven gear P10/R may be operably connected to the intermediate shaft CS through the sleeve SLE3 of the third synchronizer SL3, and the second clutch CL2 and the brake BK may be operated at the reverse speed stage REV.

Therefore, the torque of the engine ENG may be shifted into the fifth preliminarily shifted torque through the second clutch CL2, the third input shaft IS3, the 10/R drive gear D10/R, the idle gear IDG, the 10/R driven gear P10/R, the intermediate shaft CS, the transfer gear TFG, and the 3/7 drive gear D3/7, and the fifth preliminarily shifted torque may be input to the fourth rotation shaft TM4 of the third shifting member T3 as the inverse rotation speed.

As shown in FIG. 3, since the first rotation shaft TM1 may be operated as the fixed element by operation of the brake BK in a state that the fifth preliminarily shifted torque is input to the fourth rotation shaft TM4, a reverse shift line SR may be formed in the third shifting member T3. Therefore, a gear ratio of REV may be output through the second rotation shaft TM2 that is the output member.

[First Forward Speed Stage]

As shown in FIG. 2, the 1/9 drive gear D1/9 may be operably connected to the second input shaft IS2 through the sleeve SLE1 of the first synchronizer SL1, and the first clutch CL1 and the brake BK may be operated at the first forward speed stage D1.

Therefore, the torque of the engine ENG may be shifted into the first preliminarily shifted torque through the first clutch CL1, the second input shaft IS2, the 1/9 drive gear D1/9, the 1/9 driven gear P1/9, the intermediate shaft CS, the transfer gear TFG, and the 3/7 drive gear D3/7, and the first preliminarily shifted torque may be input to the fourth rotation shaft TM4 of the third shifting member T3.

As shown in FIG. 3, since the first rotation shaft TM1 may be operated as the fixed element by operation of the brake BK in a state that the first preliminarily shifted torque is input to the fourth rotation shaft TM4, a first shift line SP1 may be formed in the third shifting member T3. Therefore, a gear ratio of D1 may be output through the second rotation shaft TM2 that is the output member.

[Second Forward Speed Stage]

As shown in FIG. 2, the 2/8 driven gear P2/8 may be operably connected to the intermediate shaft CS through the sleeve SLE2 of the second synchronizer SL2, and the second clutch CL2 and the brake BK may be operated at the second forward speed stage D2.

Therefore, the torque of the engine ENG may be shifted into the third preliminarily shifted torque through the second clutch CL2, the third input shaft IS3, the 2/8 drive gear D2/8, the 2/8 driven gear P2/8, the intermediate shaft CS, the transfer gear TFG, and the 3/7 drive gear D3/7, and the third preliminarily shifted torque may be input to the fourth rotation shaft TM4 of the third shifting member T3.

As shown in FIG. 3, since the first rotation shaft TM1 may be operated as the fixed element by operation of the brake BK in a state that the third preliminarily shifted torque is input to the fourth rotation shaft TM4, a second shift line SP2 may be formed in the third shifting member T3. Therefore, a gear ratio of D2 may be output through the second rotation shaft TM2 that is the output member.

[Third Forward Speed Stage]

As shown in FIG. 2, the 3/7 drive gear D3/7 may be operably connected to the second input shaft IS2 through the sleeve SLE1 of the first synchronizer SL1, and the first clutch CL1 and the brake BK may be operated at the third forward speed stage D3.

Therefore, the torque of the engine ENG may be input to the fourth rotation shaft TM4 of the third shifting member T3 as the second preliminarily shifted torque through the first clutch CL1, the second input shaft IS2, and the 3/7 drive gear D3/7.

As shown in FIG. 3, since the first rotation shaft TM1 may be operated as the fixed element by operation of the brake BK in a state that the second preliminarily shifted torque is input to the fourth rotation shaft TM4, a third shift line SP3 may be formed in the third shifting member T3. Therefore, a gear ratio of D3 may be output through the second rotation shaft TM2 that is the output member.

[Fourth Forward Speed Stage]

As shown in FIG. 2, the 4/6 driven gear P4/6 may be operably connected to the intermediate shaft CS through the sleeve SLE2 of the second synchronizer SL2, and the second clutch CL2 and the brake BK may be operated at the fourth forward speed stage D4.

Therefore, the torque of the engine ENG may be shifted into the fourth preliminarily shifted torque through the second clutch CL2, the third input shaft IS3, the 4/6 drive gear D4/6, the 4/6 driven gear P4/6, the intermediate shaft CS, the transfer gear TFG, and the 3/7 drive gear D3/7, and the fourth preliminarily shifted torque may be input to the fourth rotation shaft TM4 of the third shifting member T3.

As shown in FIG. 3, since the first rotation shaft TM1 may be operated as the fixed element by operation of the brake BK in a state that the fourth preliminarily shifted torque is input to the fourth rotation shaft TM4, a fourth shift line SP4 may be formed in the third shifting member T3. Therefore, a gear ratio of D4 may be output through the second rotation shaft TM2 that is the output member.

[Fifth Forward Speed Stage]

As shown in FIG. 2, the first, second, and third synchronizers SL1, SL2, and SL3 may maintain neutral states, and the third clutch CL3 and the brake BK may be operated at the fifth forward speed stage D5.

Therefore, since the torque of the engine ENG may be input to the third rotation shaft TM3 through the first input shaft IS1 and the first rotation shaft TM1 may be operated as the fixed element by operation of the brake BK, a fifth shift line SP5 may be formed in the third shifting member T3. Therefore, a gear ratio of D5 may be output through the second rotation shaft TM2 that is the output member.

[Sixth Forward Speed Stage]

As shown in FIG. 2, the 4/6 driven gear P4/6 may be operably connected to the intermediate shaft CS through the sleeve SLE2 of the second synchronizer SL2, and the second and third clutches CL2 and CL3 may be operated at the sixth forward speed stage D6.

Therefore, the torque of the engine ENG may be shifted into the fourth preliminarily shifted torque through the third input shaft IS3, the 4/6 drive gear D4/6, the 4/6 driven gear P4/6, the intermediate shaft CS, the transfer gear TFG, and the 3/7 drive gear D3/7 by operation of the second clutch CL2, and the fourth preliminarily shifted torque may be input to the fourth rotation shaft TM4 of the third shifting member T3.

In addition, the torque of the engine ENG may be input to the third rotation shaft TM3 of the third shifting member T3 through the first input shaft IS1 by operation of the third clutch CL3.

As shown in FIG. 3, since the torque of the engine ENG may be input to the third rotation shaft TM3 and the fourth preliminarily shifted torque may be input to the fourth rotation shaft TM4, a sixth shift line SP6 may be formed in the third shifting member T3. Therefore, a gear ratio of D6 may be output through the second rotation shaft TM2 that is the output member.

[Seventh Forward Speed Stage]

As shown in FIG. 2, the 3/7 drive gear D3/7 may be operably connected to the second input shaft IS2 through the sleeve SLE1 of the first synchronizer SL1, and the first and third clutches CL1 and CL3 may be operated at the seventh forward speed stage D7.

Therefore, the torque of the engine ENG may be input to the fourth rotation shaft TM4 of the third shifting member T3 as the second preliminarily shifted torque through the first clutch CL1, the second input shaft IS2, and the 3/7 drive gear D3/7.

In addition, the torque of the engine ENG may be input to the third rotation shaft TM3 of the third shifting member T3 through the first input shaft IS1 by operation of the third clutch CL3.

As shown in FIG. 3, since the torque of the engine ENG may be input to the third rotation shaft TM3 and the second preliminarily shifted torque may be input to the fourth rotation shaft TM4, the first and second planetary gear sets PG1 and PG2 may be integrally rotated and a seventh shift line SP7 may be formed in the third shifting member T3. Therefore, a gear ratio of D7 may be output through the second rotation shaft TM2 that is the output member.

[Eighth Forward Speed Stage]

As shown in FIG. 2, the 2/8 driven gear P2/8 may be operably connected to the intermediate shaft CS through the sleeve SLE2 of the second synchronizer SL2, and the second and third clutches CL2 and CL3 may be operated at the eighth forward speed stage D8.

Therefore, the torque of the engine ENG may be shifted into the third preliminarily shifted torque through the second clutch CL2, the third input shaft IS3, the 2/8 drive gear D2/8, the 2/8 driven gear P2/8, the intermediate shaft CS, the transfer gear TFG, and the 3/7 drive gear D3/7, and the third preliminarily shifted torque may be input to the fourth rotation shaft TM4 of the third shifting member T3.

In addition, the torque of the engine ENG may be input to the third rotation shaft TM3 of the third shifting member T3 by operation of the third clutch CL3.

As shown in FIG. 3, since the torque of the engine ENG may be input to the third rotation shaft TM3 and the third preliminarily shifted torque may be input to the fourth rotation shaft TM4, an eighth shift line SP8 may be formed in the third shifting member T3. Therefore, a gear ratio of D8 may be output through the second rotation shaft TM2 that is the output member.

[Ninth Forward Speed Stage]

As shown in FIG. 2, the 1/9 drive gear D1/9 may be operably connected to the second input shaft IS2 through the sleeve SLE1 of the first synchronizer SL1, and the first and third clutches CL1 and CL3 may be operated at the ninth forward speed stage D9.

Therefore, the torque of the engine ENG may be shifted into the first preliminarily shifted torque through the first clutch CL1, the second input shaft IS2, the 1/9 drive gear D1/9, the 1/9 driven gear P1/9, the intermediate shaft CS, the transfer gear TFG, and the 3/7 drive gear D3/7, and the first preliminarily shifted torque may be input to the fourth rotation shaft TM4 of the third shifting member T3.

In addition, the torque of the engine ENG may be input to the third rotation shaft TM3 of the third shifting member T3 through the first input shaft IS1 by operation of the third clutch CL3.

As shown in FIG. 3, since the torque of the engine ENG may be input to the third rotation shaft TM3 and the first preliminarily shifted torque may be input to the fourth rotation shaft TM4, a ninth shift line SP9 may be formed in the third shifting member T3. Therefore, a gear ratio of D9 may be output through the second rotation shaft TM2 that is the output member.

[Tenth Forward Speed Stage]

As shown in FIG. 2, the 10/R driven gear P10/R may be operably connected to the intermediate shaft CS through the sleeve SLE3 of the third synchronizer SL3, and the second and third clutches CL2 and CL3 may be operated at the tenth forward speed stage D10.

Therefore, the torque of the engine ENG may be shifted into the fifth preliminarily shifted torque through the second clutch CL2, the third input shaft IS3, the 10/R drive gear D10/R, the idle gear IDG, the 10/R driven gear P10/R, the intermediate shaft CS, the transfer gear TFG, and the 3/7 drive gear D3/7, and the fifth preliminarily shifted torque may be input to the fourth rotation shaft TM4 of the third shifting member T3 as an inverse rotation speed.

In addition, the torque of the engine ENG may be input to the third rotation shaft TM3 of the third shifting member T3 through the first input shaft IS1 by operation of the third clutch CL3.

As shown in FIG. 3, since the torque of the engine ENG may be input to the third rotation shaft TM3 and the fifth preliminarily shifted torque may be input to the fourth rotation shaft TM4, a tenth shift line SP10 may be formed in the third shifting member T3. Therefore, a gear ratio of D10 may be output through the second rotation shaft TM2 that is the output member.

The power transmission apparatus for a vehicle according to a first exemplary embodiment of the present disclosure may achieve the reverse speed stage and ten forward speed stage by adding two planetary gear sets to a DCT provided with three synchronizers. Therefore, multiple speed stages may be achieved and fuel economy may be improved.

In addition, an interior layout may be simplified, and a length and weight of the DCT may be minimized by reducing the number of components.

In addition, since even-numbered speed stages and odd-numbered speed stages are achieved in turns by alternately operating two clutches, smooth shifting may be achieved.

Figure 4:
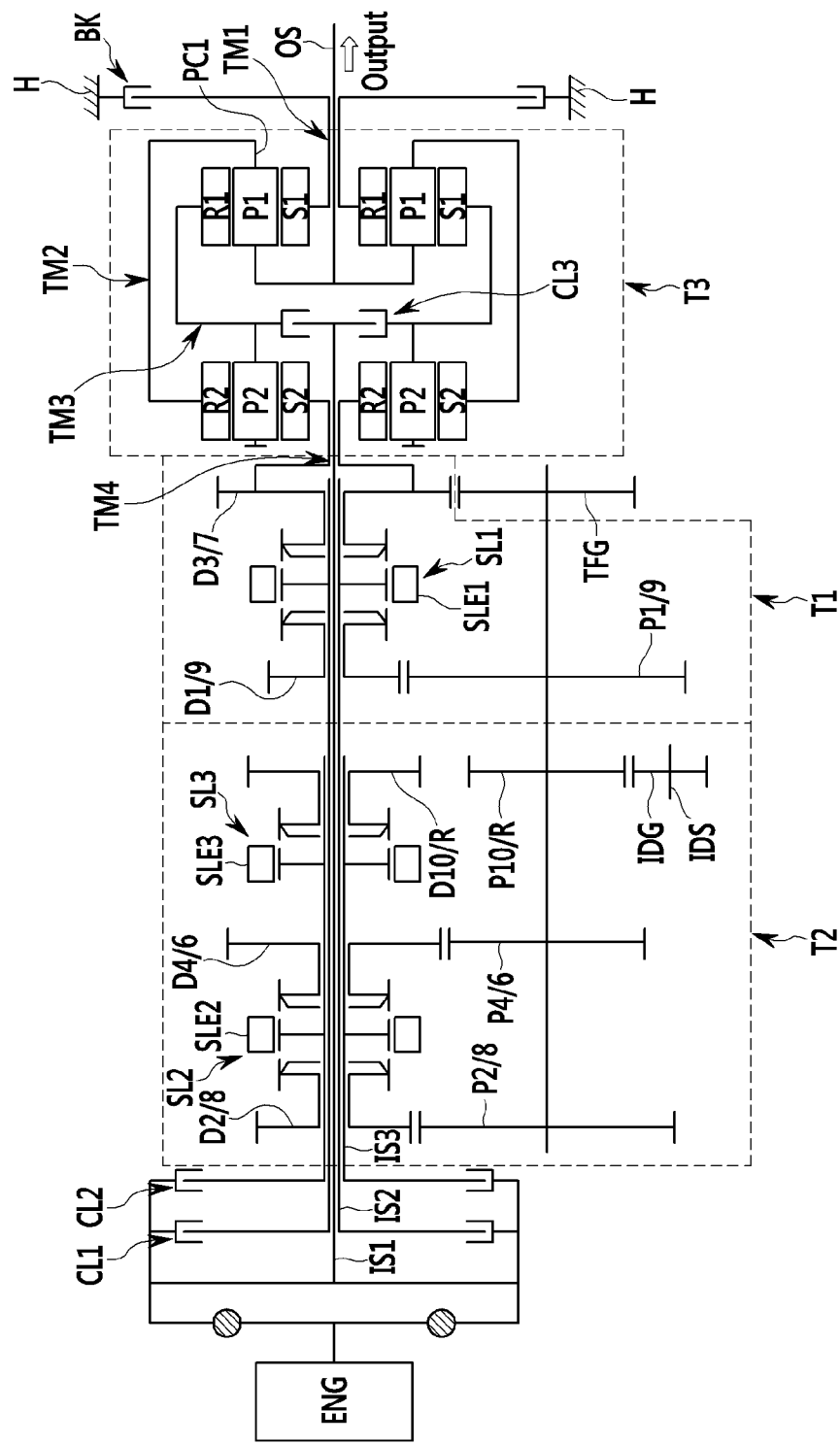
FIG. 4 is a schematic diagram of a power transmission apparatus for a vehicle according to another exemplary embodiment of the present disclosure.

FIG. 4 is a schematic diagram of a power transmission apparatus for a vehicle according to another exemplary embodiment of the present disclosure.

Referring to FIG. 4, the second and third synchronizers SL2 and SL3 included in the second shifting member T2 may be disposed on the intermediate shaft CS in the power transmission apparatus for a vehicle according to a first exemplary embodiment of the present disclosure, but the second and third synchronizers SL2 and SL3 may be disposed on the third input shaft IS3 according to a second exemplary embodiment.

Therefore, the 2/8 drive gear D2/8 and the 4/6 drive gear D4/6 may be rotatably disposed on the third input shaft IS3, and the second synchronizer SL2 operably may connect the 2/8 drive gear D2/8 or the 4/6 drive gear D4/6 to the third input shaft IS3 selectively. In addition, the 2/8 driven gear P2/8 engaged with the 2/8 drive gear D2/8 and the 4/6 driven gear P4/6 engaged with the 4/6 drive gear D4/6 may be fixedly disposed on the intermediate shaft CS.

Further, the 10/R drive gear D10/R may be rotatably disposed on the third input shaft IS3 and the third synchronizer SL3 may operably connect the 10/R drive gear D10/R to the third input shaft IS3 selectively. In addition, the 10/R driven gear P10/R engaged with the 10/R drive gear D10/R may be fixedly disposed on the intermediate shaft CS.

The constituent elements and shifting processes according to a second exemplary embodiment of the present disclosure may be the same as those according to a first exemplary embodiment except for arrangements of the second and third synchronizers SL2 and SL3 and the drive gears and the driven gears related thereto. Therefore, detailed description thereof will be omitted.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A power transmission apparatus for a vehicle comprising:
   a first input shaft directly connected to an engine;
   a second input shaft enclosing the first input shaft and rotating independently from the first input shaft and selectively receiving torque of the engine through a first clutch;
   a third input shaft enclosing the second input shaft and rotating independently from the second input shaft and selectively receiving the torque of the engine through a second clutch;
   an intermediate shaft disposed in parallel with the first, second, and third input shafts;
   a transfer gear fixedly disposed on the intermediate shaft and outputting torque of the intermediate shaft;
   a first shifting member including at least two drive gears rotatably disposed on the second input shaft, at least one driven gear fixedly disposed on the intermediate shaft, and at least one synchronizer selectively connecting any of the at least two drive gears to the second input shaft, wherein one of the at least two drive gears is engaged with the transfer gear and another of the at least two drive gears is engaged with the at least one driven gear;
   a second shifting member including at least two drive gears fixedly disposed on the third input shaft, at least two driven gears rotatably disposed on the intermediate shaft, and at least one synchronizer selectively connecting any of the at least two driven gears to the intermediate shaft, wherein one of the at least two drive gears is operably connected to one of the at least two driven gears through an idle gear and another of the at least two drive gears is engaged with another of the at least two driven gears; and
   a third shifting member receiving torque of the first shifting member or the second shifting member from the one of the at least two drive gears of the first shifting member which is engaged with the transfer gear, selectively receiving the torque of the engine from the first input shaft, and changing and outputting the torque received from the first shifting member or the second shifting member and the torque of the engine.

2. The power transmission apparatus of claim 1, wherein the at least two drive gears of the first shifting member include a 1/9 drive gear and a 3/7 drive gear, the at least one driven gear of the first shifting member includes a 1/9 driven gear, and the at least one synchronizer of the first shifting member includes a first synchronizer, and
   wherein the 1/9 drive gear is engaged with the 1/9 driven gear, the 3/7 drive gear is engaged with the transfer gear, and the first synchronizer selectively connects the 1/9 drive gear or the 3/7 drive gear to the second input shaft.

3. The power transmission apparatus of claim 1, wherein the at least two drive gears of the second shifting member include a 2/8 drive gear, a 4/6 drive gear, and a 10/R drive gear, the at least two driven gears of the second shifting member include a 2/8 driven gear, a 4/6 driven gear, and a 10/R driven gear, and the at least one synchronizer of the second shifting member includes second and third synchronizers, and
   wherein the 2/8 drive gear is engaged with the 2/8 driven gear, the 4/6 drive gear is engaged with the 4/6 driven gear, the 10/R drive gear is operably connected to the 10/R drive gear through the idle gear, the second synchronizer selectively connects the 2/8 driven gear or the 4/6 driven gear to the intermediate shaft, and the third synchronizer selectively connects the 10/R driven gear to the intermediate shaft.

4. The power transmission apparatus of claim 1, wherein the third shifting member comprises:
   a first planetary gear set including a first sun gear, a first planet carrier and a first ring gear as rotation elements thereof;
   a second planetary gear set including a second sun gear, a second planet carrier and a second ring gear as rotation elements thereof;
   a first rotation shaft directly connected to the first sun gear and selectively connected to a transmission housing through a brake;

a second rotation shaft directly connecting the first planet carrier to the second ring gear and directly connected to an output shaft;

a third rotation shaft directly connecting the first ring gear to the second planet carrier and selectively connected to the first input shaft through a third clutch; and a fourth rotation shaft directly connected to the second sun gear and receiving torque from the first shifting member and the second shifting member.

5. The power transmission apparatus of claim 4, wherein the fourth rotation shaft is directly connected to the drive gear engaged with the transfer gear.

6. A power transmission apparatus for a vehicle comprising:

a first input shaft directly connected to an engine;

a second input shaft enclosing the first input shaft and rotating independently from the first input shaft and selectively receiving torque of the engine through a first clutch;

a third input shaft enclosing the second input shaft and rotating independently from the second input shaft and selectively receiving the torque of the engine through a second clutch;

an intermediate shaft disposed in parallel with the first, second, and third input shafts;

a transfer gear fixedly disposed on the intermediate shaft and outputting torque of the intermediate shaft;

a first shifting member including at least two drive gears rotatably disposed on the second input shaft, at least one driven gear fixedly disposed on the intermediate shaft, and at least one synchronizer selectively connecting any of the at least two drive gears to the second input shaft, wherein one of the at least two drive gears is engaged with the transfer gear and another of the at least two drive gears is engaged with the at least one driven gear;

a second shifting member including at least two drive gears rotatably disposed on the third input shaft, at least two driven gears fixedly disposed on the intermediate shaft, and at least one synchronizer selectively connecting any of the at least two drive gears to the third input shaft, wherein one of the at least two drive gears is operably connected to one of the at least two driven gears through an idle gear and another of the at least two drive gears is engaged with another of the at least two driven gears; and a third shifting member receiving torque of the first shifting member or the second shifting member from the one of the at least two drive gears of the first shifting member which is engaged with the transfer gear, selectively receiving the torque of the engine from the first input shaft, and changing and outputting the torque received from the first shifting member or the second shifting member and the torque of the engine.

7. The power transmission apparatus of claim 6, wherein the at least two drive gears of the first shifting member include a 1/9 drive gear and a 3/7 drive gear, the at least one driven gear of the first shifting member includes a 1/9 driven gear, and the at least one synchronizer of the first shifting member includes a first synchronizer, and wherein the 1/9 drive gear is engaged with the 1/9 driven gear, the 3/7 drive gear is engaged with the transfer gear, and the first synchronizer selectively connects the 1/9 drive gear or the 3/7 drive gear to the second input shaft.

8. The power transmission apparatus of claim 6, wherein the at least two drive gears of the second shifting member include a 2/8 drive gear, a 4/6 drive gear, and a 10/R drive gear, the at least two driven gears of the second shifting member include a 2/8 driven gear, a 4/6 driven gear, and a 10/R driven gear, and the at least one synchronizer of the second shifting member includes second and third synchronizers, and wherein the 2/8 drive gear is engaged with the 2/8 driven gear, the 4/6 drive gear is engaged with the 4/6 driven gear, the 10/R drive gear is operably connected to the 10/R drive gear through the idle gear, the second synchronizer selectively connects the 2/8 drive gear or the 4/6 drive gear to the third input shaft, and the third synchronizer selectively connects the 10/R drive gear to the third input shaft.

9. The power transmission apparatus of claim 6, wherein the third shifting member comprises:

a first planetary gear set including a first sun gear, a first planet carrier and a first ring gear as rotation elements thereof;

a second planetary gear set including a second sun gear, a second planet carrier and a second ring gear as rotation elements thereof;

a first rotation shaft directly connected to the first sun gear and selectively connected to a transmission housing through a brake;

a second rotation shaft directly connecting the first planet carrier to the second ring gear and directly connected to an output shaft;

a third rotation shaft directly connecting the first ring gear to the second planet carrier and selectively connected to the first input shaft through a third clutch; and a fourth rotation shaft directly connected to the second sun gear and receiving torque from the first shifting member and the second shifting member.

10. The power transmission apparatus of claim 9, wherein the fourth rotation shaft is directly connected to the drive gear engaged with the transfer gear.

* * * * *